UNITED STATES PATENT OFFICE.

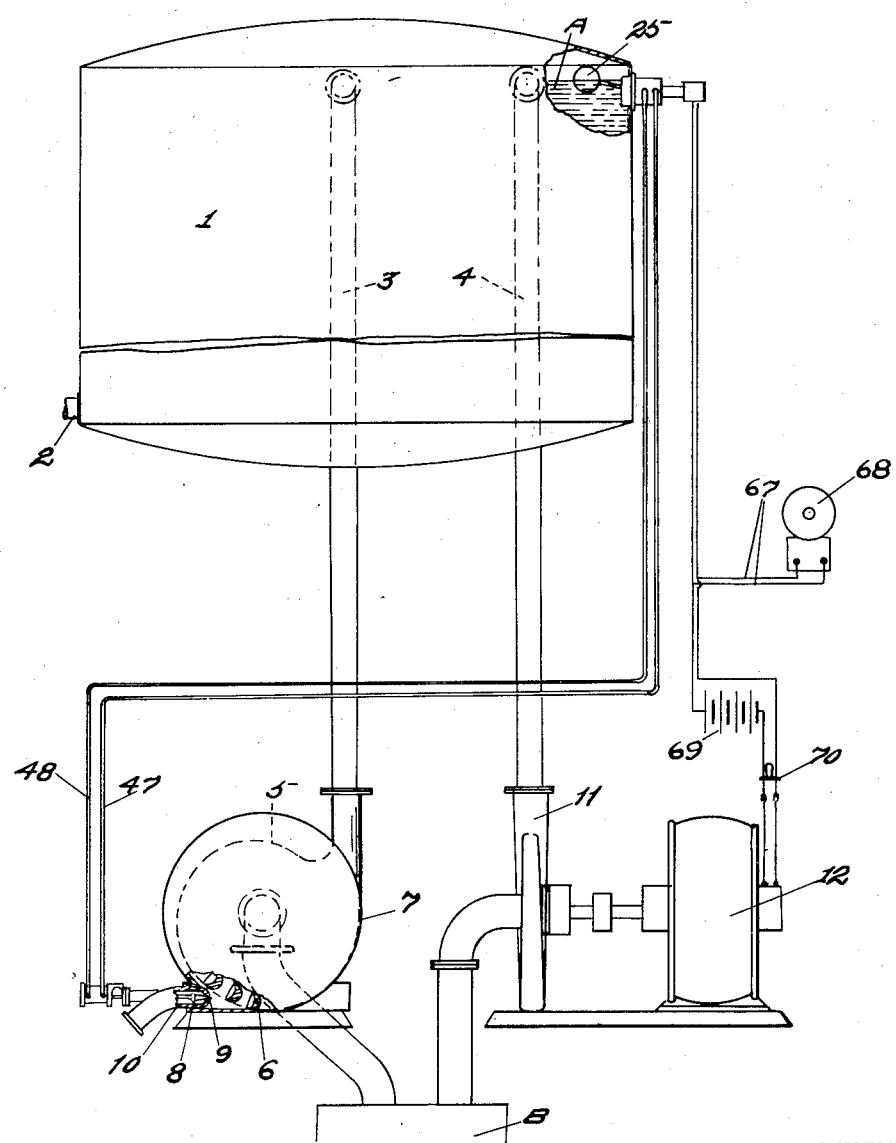

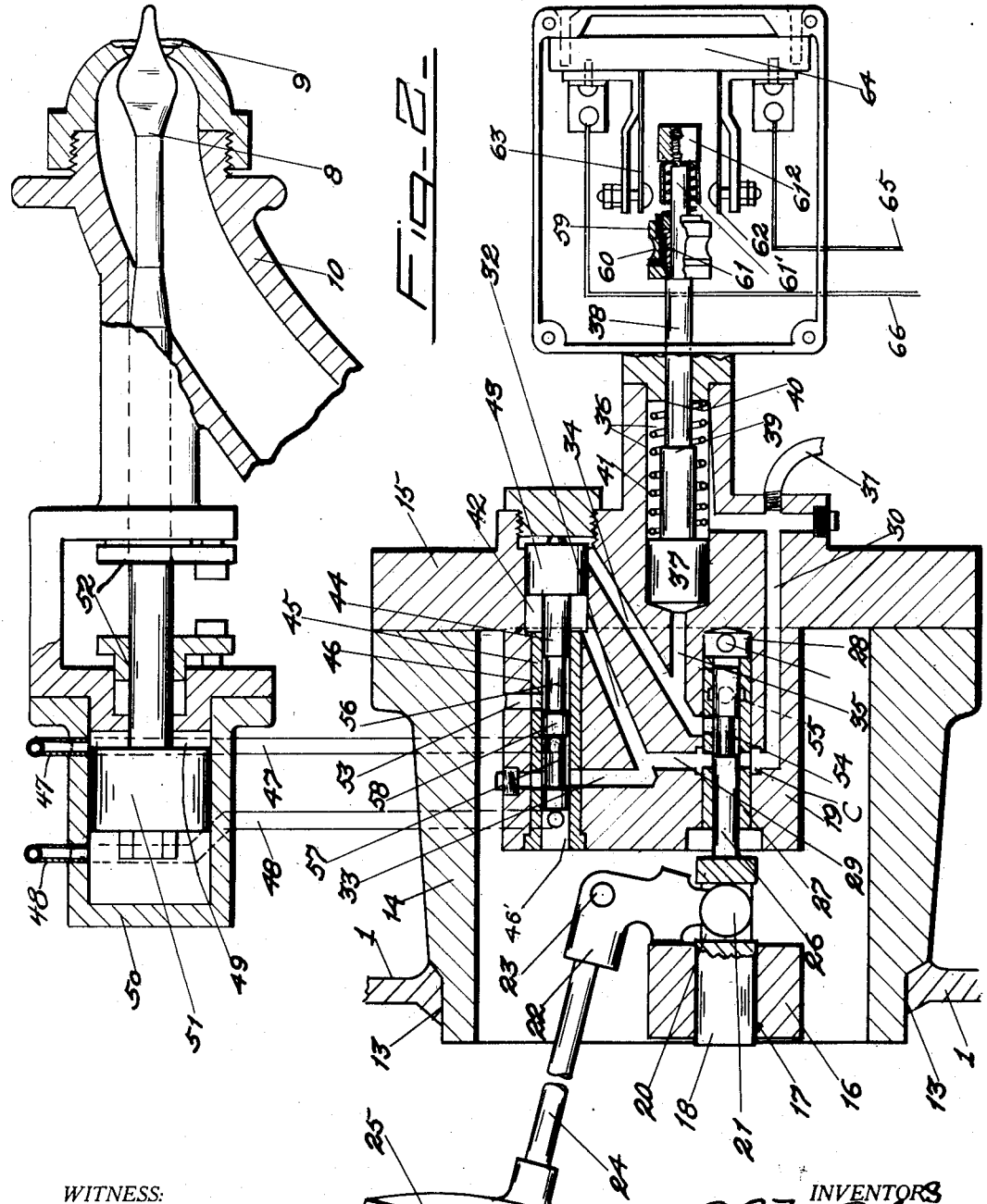

CHESTER B. McAULAY, OF SAN FRANCISCO, AND ELY C. HUTCHINSON, OF OAKLAND, CALIFORNIA, ASSIGNORS TO PELTON WATER WHEEL COMPANY, OF SAN FRANCISCO, CALIFORNIA, A CORPORATION OF CALIFORNIA.

FLUID-LEVEL REGULATOR.

1,382,735.     Specification of Letters Patent.     Patented June 28, 1921.

Application filed June 12, 1918. Serial No. 239,561.

*To all whom it may concern:*

Be it known that we, CHESTER B. McAULAY and ELY C. HUTCHINSON, citizens of the United States, residing the said McAULAY at the city and county of San Francisco and State of California, and the said HUTCHINSON at the city of Oakland, Alameda county, State of California, have invented certain new and useful Improvements in Fluid-Level Regulators, of which the following is a specification.

The present invention relates to an automatic fluid pressure regulating system, wherein a plurality of devices controlled by a single fluid level controlling mechanism are employed for maintaining or restoring the fluid level within a container to a given point.

The invention has for its principal objects to provide a construction wherein a plurality of devices are employed for maintaining the fluid level at a given height, whereby if the source of power for one mechanism fails the other mechanism may be relied on to maintain the fluid level; and to provide a construction wherein a simple mechanism operated by the fluid level controls the starting and stopping of the independent mechanisms for maintaining the fluid level at a given point.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a diagrammatic view of the preferred embodiment of our invention illustrating an electric and hydraulic means for maintaining the fluid level at a given point.

Fig. 2 is a view in section of the liquid level controlling means and the connection between the same and a needle nozzle or gate of standard construction.

Referring more particularly to the drawings, wherein like characters of reference designate corresponding parts,—the numeral 1 indicates a closed storage reservoir for containing a fluid under pressure preferably to a point indicated by the fluid level line A. The reservoir 1 is provided with the outlet 2 and the fluid supply connections 3 and 4, the connection 3 extending from a suitable pump 5, operated preferably by a water wheel 6 within a suitable housing 7 and controlled by a needle 8 regulating the discharge of operating fluid through the opening 9 in the nozzle 10. The connection 4 extends from a pump 11, similar to pump 5, and operated by an electric motor 12.

The mechanism operated by the liquid level within the reservoir 1 for controlling the operation of the water wheel 6 or motor 12 is constructed to operate in the following manner:—The wall of the reservoir 1 is provided with an opening 13 within which is seated a cylindrical member or shell 14 opening at its interior into the reservoir 1 and closed at its outer end by a suitable plate or cover 15. The member 14 is provided with a support 16 formed with a guide opening 17 in which is mounted one end of a plunger 18. The plunger is provided adjacent its end and at a point exteriorly of the inner end of the annular projection 19 on the plate 15 with a slot 20 in which is received the ball end 21 of a lever 22 fulcrumed as at 23 at a point within the member 14, and from said lever extends a rod 24 carrying on its end a float 25 operating within the liquid level in the reservoir 1.

The reduced valve end 26 of the plunger 18 is longitudinally movable in a bushing 27 positioned within a bore 28 in the projecting portion 19.

Extending laterally from the bore 28 and bushing 27 therein are the channels 29 and 30, the channel 30 connecting with the exhaust pipe 31 to atmosphere and from the channel 29 extends the laterals 32 and 33. Communicating with the bore 28, through the bushing 27, and arranged at a point adjacent the channel 29 is a channel 34 from which intermediate of its length extends a lateral 35, said lateral communicating with the inner end of a chamber 36, in which is mounted to reciprocate a plunger 37 carried on the inner end of the rod 38, the plunger being limited in its outward reciprocation by the contacting of the shoulder 39 thereof with the inner face of a closure 40 for the chamber 36. A coiled spring 41 within the chamber 36 assists in restoring the plunger 37 to its normal position.

The channels 32 and 34 communicate at one end with the opposite ends of the chamber 42, in which is mounted to reciprocate a plunger 43 carrying a reciprocating valve 44 operating within a bushing 45 within a bore 46 in the projection 19, the bore being open at its inner end, as at 46', into the member 14. Communicating with the interior of the bushing 45, at spaced intervals, adjacent the open end thereof, are the ends of pipes 47 and 48, the opposite ends thereof connecting with the piston chamber 49 of the needle valve control casing 50, and within said chamber is mounted a piston 51 carried at the inner end of the needle valve 8, the shank of said valve extending through the bushings 52 in the wall of the nozzle 10, as in Fig. 2 of the drawings.

The channel 33 communicates with the interior of the bushing 45 intermediate the connection of the pipes 47 and 48, and a fluid pressure inlet 53 communicates with the interior of the bushing at a point intermediate the chamber 42 and the pipe 47, and provides a connection between the interior of the bushing and the interior of the reservoir 1. The valve end 26 of the plunger 18 is provided with an annular recess 54 of sufficient length to connect either the ends of the channels 34 and 29 or connect the end of the channel 34 with the fluid pressure inlet 55 extending through the bushing 27 and communicating with the interior of the reservoir 1 on the reciprocation of said plunger.

The valve 44 is provided with the spaced annular portions 56 and 57, the portion 56 being of sufficient length to connect the channel 53 and end of the pipe 47, and the reduced portion 57 is of a sufficient length when the solid separating portion 58 between the portions 56 and 57 is at a point between the end of the pipe 47 and channel 33, due to the reciprocation of the valve, to connect the end of the pipe 48 with the channel 33.

The rod 38 carries on its end a suitable contacting member 59 longitudinally movable therewith and formed with an annular groove 60 and insulated by the material 61 from the rod 38. A coiled spring 61' surrounding the rod 38 between the cap 61² at the end thereof and the contacting member 59, insures a quick movement of the member 59 on the breaking of the motor controlling circuit, hereinafter described. The outward movement of the rod 38 completes a circuit between the spring contact fingers 62 and 63 carried by a base 64. From the terminals of the respective contact fingers extend the leads 65 and 66 from which, if desirable, extend the bell operating leads 67 connecting with a suitable alarm bell 68, said leads 65 and 66 connecting with the motor 12 and forming an operating circuit therefor in which is mounted a suitable source of electric energy 69 and a controlling switch 70. If desirable, a controlling valve may be positioned within the pipes 47 and 48 to interrupt the operation of the water wheel.

The device operates in the following manner:—

The dropping of the liquid level in the reservoir 1 below the point A causes a lowering of the float 25 which moves the plunger 18 inwardly from the position as in Fig. 2, until such time as the edge of the recess 54 of the valve 26 uncovers the pressure inlet 55, thereby admitting fluid under pressure into the channels 34 and 35. The fluid pressure in said channels 34 and 35 causes a simultaneous movement of the plungers 37 and 43, the plunger 37 making a connection in the motor operating circuit by connecting the terminals 62 and 63, and if the switch 70 is in closed position, said connection causes the operation of the pump 11 by the motor 12 to supply fluid under pressure from a suitable tank or container B into the reservoir 1.

The longitudinal movement of the plunger 43 causes an operation of the valve 44 until the movement thereof positions the edge of the reduced portion 56 to uncover the end of the pipe 47 simultaneously with which the edge of the reduced portion 57 is moved to uncover the end of the pipe 48. This operation permits fluid under pressure to enter the pressure inlet 53 and pass into the pipe 47, causing a movement of the piston 51 to unseat the needle valve 8 controlling the water wheel 6, operating the pump 5 and supply fluid under pressure, to the reservoir 1 from the tank supply B. The fluid displaced by the rearward movement of the piston 51 passes through the pipe 48, reduced portion 57, channels 33 and 29, annular portion C and channel 30, exhausting through the pipe 31; thus independent means operated through two different sources of power are provided for maintaining the fluid level within the reservoir 1 at a given height.

On the fluid level in the reservoir 1 reaching the point A, the float 25 will be raised thereby to move the plunger 18 to the position as in Fig. 2, causing the valve 26 to cut off the communication between the inlet 55 and channel 34 and position the reduced portion 54 thereof to make connection between the lower end of the channel 34 and channel 30. The positioning of the valve 26 as above described releases the fluid pressure in rear of the plungers 43 and 37, permitting the spring 41 to retract the plunger 37, breaking connection between the spring contact fingers 62 and 63 and interrupting the power circuit to the motor. This positioning of the valve 26 to open the channel 34 to the channel 30 permits the pressure in the reservoir 1 to act on the end of the valve 44 to force the plunger 43 at the end thereof to the inner end of the chamber 42, shutting off communication between 53 and 47 and making communication between 47 and 33, which permits of the releasing of the pressure in the chamber 49 in front of the piston 51 and uncovers the end of the pipe 48, permitting the fluid pressure in the tank 1 to pass therethrough and act on the piston 51 to force said needle valve 8 to seated position, as in the drawing, thus interrupting the operation of the water wheel.

While we have described and for convenience have illustrated duplicate pumps operated by separate motor mechanisms, it is to be understood that a single pump may be employed, and the same connected for operation by either the electric motor or the hydraulic motor or water wheel, and while we have illustrated a pump of the rotary type, it is to be understood that any other suitable type of pump may be employed. While we have illustrated an electric and hydraulic means for operating the pumps to maintain the liquid level within the reservoir at a given height, it is to be understood that any two different types of mechanism may be employed, such as a steam turbine and a device operated by air or other fluid under pressure.

Having thus described our invention, what we claim as new and desire to protect by Letters Patent is:— .

1. In combination with a receptacle for containing fluid under pressure and provided with a fluid outlet, a fluid supply therefor and connected therewith, pumps for supplying fluid to the receptacle, a hydraulic motor for one of said pumps, a needle valve control fluid supply for operating the same, an electric motor for the other pump, an electric circuit for operating the same and including a switch, a plunger operated by the liquid level within said receptacle, and independent means operated by the pressure within said receptacle and controlled by the movement of said plunger for operating said needle valve and said switch whereby the operation of said motors is controlled dependent on the height of the liquid level within said container.

2. A controlling device of the character described, comprising a supporting member, a float, a fluid valve operated thereby, said supporting member having independent fluid chambers and movable motor controlling elements in said chambers, means for normally maintaining said elements in one position, and ports in said member between the fluid valve and said elements for admitting fluid to said chambers to operate the elements therein upon a determined actuation of the fluid valve.

3. The combination with a receptacle for containing a fluid provided with a fluid outlet, a fluid supply connected with the receptacle, a pump, a hydraulic motor therefor, a valve for controlling the fluid supply for said motor for operating the same, a second pump, an electrical motor for operating said pump, an electric circuit for said motor, and a switch in said circuit, a plunger operated by the fluid level within the receptacle, independent shiftable motor controlling elements operated by the pressure within the receptacle upon an actuation of the plunger for operating said valve and said switch whereby the operation of said motors are controlled automatically by the height of the fluid level within the container.

4. The combination with a receptacle for containing a fluid provided with a fluid outlet, a fluid supply connected with the receptacle, a pump and a hydraulic motor therefor, a valve for controlling the fluid supply for said motor for operating the same, a second pump, a motor therefor, an electric circuit for said motor, and a switch in said circuit, a plunger operated by the fluid level within the receptacle, independent shiftable motor controlling elements operated by the pressure within the receptacle upon an actuation of the plunger for operating said valve and said switch whereby the operation of said motor is controlled automatically by the height of the fluid level within the container, and means acting upon said shiftable elements for maintaining the same normally in a position wherein the motors are inactive.

5. A controlling device of the character described comprising a supporting member positioned adjacent a fluid receptacle, a float and a fluid valve operated by said float, a pair of movable motor controlling elements in said supporting member and adapted to be controlled by the fluid valve to simultaneously actuate said controlling elements upon a predetermined movement of the valve.

6. A controlling device of the character described, comprising a supporting member adapted to be positioned adjacent a fluid receptacle adapted to contain fluid, said supporting member having a pair of chambers therein, motor controlling elements disposed within said chambers, a common actuating valve disposed within said supporting member and ports establishing communication between said valve and said chambers, and means responsive to the fluid level in the container for actuating said valve to admit fluid pressure to said chambers to actuate the motor controlling elements.

7. A controlling device of the character described comprising a supporting member adapted to be positioned adjacent a fluid receptacle adapted to contain fluid, said supporting member having a pair of chambers therein, motor controlling elements disposed within said chambers, a common actuating valve disposed within said supporting member and ports establishing communication between said valve and said chambers, and means responsive to the level of the fluid in the container for actuating said valve to admit fluid pressure to said chambers to actuate the motor controlling elements, and means for normally maintaining said motor controlling elements in an inactive position.

8. The combination with a receptacle for containing a fluid, of fluid supply conduits therefor, a plurality of independent power sources operated by energies of different characters for feeding fluid to the receptacle through said fluid supply conduits, independently controllable means for each of said power sources, and a common actuating device responsive to the fluid level within the receptacle for controlling said independent power sources, substantially as described.

9. The combination with a receptacle for containing fluid, of means for supplying fluid thereto including a plurality of independently operable power sources actuated by energies of different characters, independently operable controlling devices for said power sources, and a single device responsive to the fluid level in the container for actuating said independent controlling devices.

10. The combination with a receptacle for receiving a supply of fluid, and means for delivering fluid thereto, comprising a plurality of independent liquid feeding pumps in communication with the receptacle, a separate motor for each pump, said motors being operable by energies of different characters whereby one may be operated entirely independent of the other, independently operable controlling devices for each motor, and means responsive to the fluid level in the container for actuating said controlling devices for placing said motors in operation.

In testimony whereof we have signed our names to this specification in the presence of two subscribing witnesses.

CHESTER B. McAULAY.
ELY C. HUTCHINSON.

Witnesses:
HARRY A. TOTTEN,
D. B. RICHARDS.